Patented Aug. 29, 1961

2,998,287
LUBRICANT SEAL AND PUMP FOR ANTI-FRICTION BEARINGS
Wesley E. Pritchett, Schenectady, N.Y., assignor to General Electric Company, a corporation of New York
Filed Jan. 2, 1959, Ser. No. 784,544
3 Claims. (Cl. 308—187)

The invention described herein relates to bearings and more particularly to an improved arrangement for circulating grease in an anti-friction bearing and for preventing its displacement axially along the length of a shaft in the machine.

Bearings of prior electrical and mechanically operating machines are furnished with what is considered an optimum amount of grease sufficient for lubricating the bearing for a predetermined period of time. In the usual construction, the bearing is initially charged with grease by the manufacturer and after the machine is placed in operation, a channel is formed in the relatively viscous grease which is a mirror image of the exposed parts intended to be lubricated. The grease is not circulated within the bearing cavities since in most cases the mechanical vibration to which the machine is subjected and shaft movement resulting from varying thrust forces is sufficient to cause the operating parts of the bearing to engage the walls of the grease channels and thus effectively provide the desired degree of lubrication. However, in those unusual instances where the machine is operated at constant load and particularly in very low temperature environments, the bearing components sometimes are not successful in drawing the grease into the proper operating areas. As a result, the bearing becomes starved for lack of lubrication even though a substantial amount of grease occupies the bearing cavities.

An additional problem directly related to bearing lubrication involves the undesired displacement of grease axially along the shaft, either during operation or when carrying out a regreasing process. In most cases, a clearance of approximately 10–15 mils usually exists between the shaft and the machine housing for providing unimpeded shaft rotation and generally for preventing ingress of foreign material and grease into the operating components of the machine. This dimension varies according to the various machine sizes but in the usual situation, it is sufficient to prevent migration of grease into areas where it is not wanted. If the bearing is inadvertently operated at high temperatures, the grease may become sufficiently fluid to flow axially along the shaft and into the machine but the major problems are presented during a regreasing operation when the old grease is replaced with new. To effect removal of old grease, the new grease is forced into the housing, thus overloading the bearing cavity and establishing a pressure which tends to force the grease axially through the clearance between the housing and the shaft and into the confines of the machine. When this occurs, the grease usually is thrown outwardly into engagement with coil end turns, in the case of a dynamoelectric machine, to cause deterioration of the insulation and in those instances where the insulation is resistant to the action of grease, the end turns nevertheless become coated and serve as an insulator effective in limiting the amount of heat capable of being dissipated during operation.

Other problems associated with operating machines having anti-friction bearings such as the inaccessibility of the machine for maintenance purposes, the difficulty in measuring and controlling the correct amount of grease required to be inserted in the bearing cavities, and the like, make clear that the need exists for a bearing construction free of the disadvantages generally mentioned above.

The object of my invention therefore is to provide such a bearing wherein the grease is constantly in a state of movement during the time that the machine is in operation.

Another object of my invention is to provide a construction capable of minimizing the flow of grease along the shaft either because of a decrease in viscosity or during the time that the old grease is being replenished in the machine.

In carrying out the objects of my invention, I locate a pair of disks of different diameter on opposite sides of a ball bearing positioned in a cavity formed in an end of the machine. The disks are mounted for rotation with the shaft and are of a size sufficient to move the grease in a loop which consists of flow axially through the bearing and through a chamber formed in the uppermost part of the housing. During operation, the grease is therefore permitted to circulate in a closed circuit through and around the bearing. Since the disks are disposed adjacent the walls defining the bearing cavity, movement of grease axially in the clearance provided between the housing and shaft is minimized. An inlet for new grease is provided in the housing along with an outlet communicating with the chamber disposed vertically above the bearing so that when new grease is added, the disks cause the old grease to flow through the outlet instead of being recirculated through the bearing.

While the specification concludes with claims particularly pointing out and distinctly claiming the subject matter which I regard as my invention, it is believed the invention will be better understood from the following description taken in connection with the accompanying drawing in which:

Figure 1:
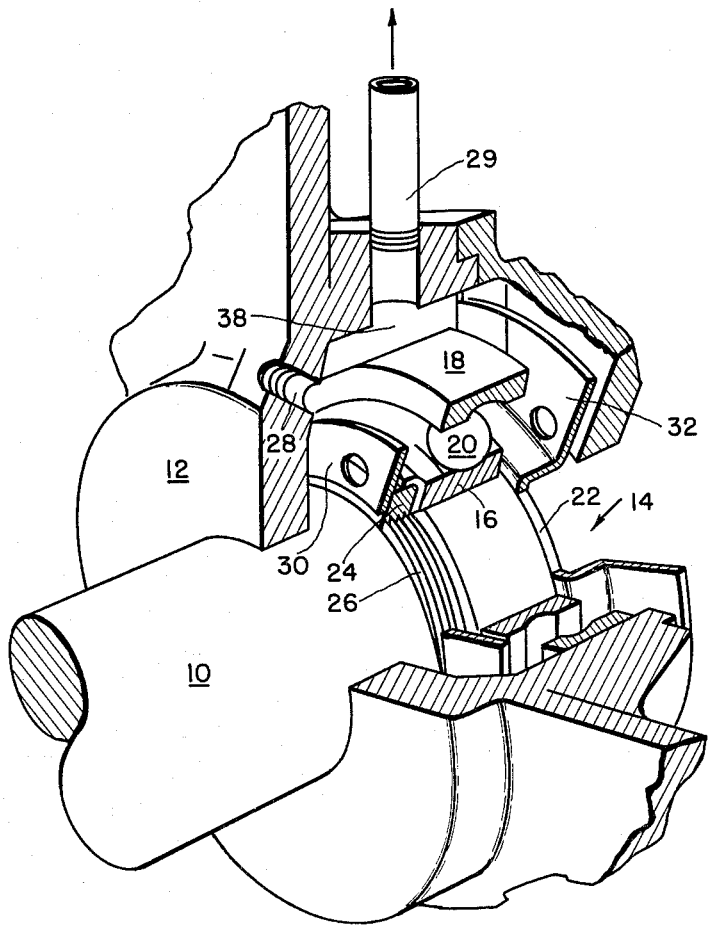
FIGURE 1 is a perspective view of a ball bearing positioned between a shaft and housing and illustrating the disposition of disks in the bearing cavity formed in the housing for the machine.

Referring now to the drawings wherein like reference characters designate like or corresponding parts throughout the several views there is shown a shaft 10 extending outwardly from any kind of a machine employing anti-friction bearings, such as a dynamoelectric machine or an engine, air compressor, or the like, now shown. In the particular arrangement chosen for illustrating the invention, the shaft 10 and housing 12 form a part of an induction motor. In the usual construction, a housing 12 is provided with a bearing cavity generally indicated as 14 for housing a ball bearing 16. The ball bearing comprises inner and outer races 16 and 18 having balls 20 positioned therebetween and arranged to be held in position by a cage, not shown, for preventing their displacement circumferentially with respect to each other. In order to secure the bearing to the shaft, a shoulder 22 is provided thereon against which a side of the inner race rests, while the other side of the inner race is contacted by a nut 24 which is threaded on the shaft as at 26 for firmly anchoring the bearing in position. The outer race 18 fits in a matching groove located in the internal peripheral portions of the housing which precludes its movement axially of the shaft. As is obvious, during operation, the inner race 16 rotates with the shaft while the outer race 18 generally is fixed in position thereby permitting the balls 20 to perform an anti-friction function.

In order to provide grease to the bearing, an inlet 28 is bored in a wall of the housing while an outlet 29 serves as a means for discharging grease from the bearing cavity during the time that grease is being replenished in the bearing.

Figure 2:
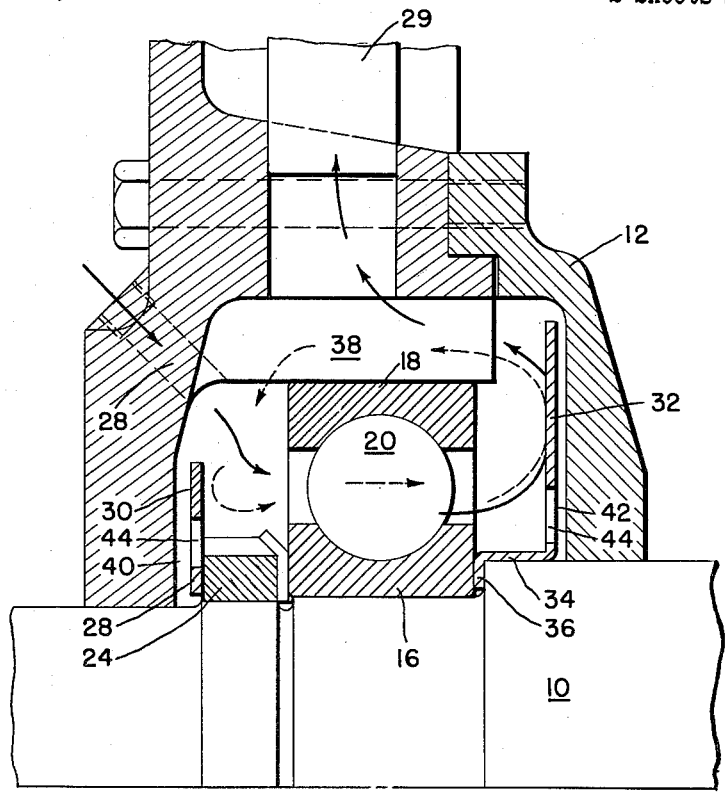
FIGURE 2 is a view in elevation partly in section, showing the path followed by the grease during normal operation of the bearing and when a regreasing process is carried out for renewing the grease in the bearing.

To obtain continuous circulation of grease through the bearing when the machine is in operation, a pair of disks 30 and 32 of different diameter are positioned on opposite sides of the bearing. As indicated in FIGURE 2, disk 30 may be welded or otherwise fixed to the nut 24 used for holding the inner race on the shaft. In the alternative, it may be threaded on the shaft. The other disk 32 of larger diameter, is equipped with a shaft engaging shoulder 34 which terminates in an inwardly directed portion 36 immovably anchored to the shaft by a friction fit provided by the inner race 16. A longitudinally extending chamber 38 is formed only in the upper part of the housing and establishes communication with opposite sides of the bearing. During normal operation, with caps attached to the inlet and outlet openings 28 and 29, the disks of different diameter impart a circulating action to the lubricant which is caused to flow in a loop as indicated by the dotted arrows in FIGURE 2. This loop includes the bearing, disk 32, channel 38, and the other disk 30. The major impetus is imparted to the grease by the larger disk 32 which discharges into chamber 38. Since the chamber is small and appears only at the top of the housing, the grease will move at a faster rate in this area and into the cavity on the opposite side of the bearing where it is engaged by the smaller disk 30 and again returned in a direction for recirculation. The difference in disk diameters effectively provide a pumping action to the grease for moving it at a very slow rate around the loop mentioned above.

In view of the fact that the disks 30 and 32 are located at the points where the shaft 10 pierces the housing, it will be seen that as the shaft rotates, the disks serve to deflect the grease away from the clearance between the shaft and the inner periphery of the housing which surrounds it. However, with disks mounted in the manner shown and rotated at a high speed, they create an area of reduced pressure at 40 and 42 and to eliminate this undesirable action, holes 44 are provided in the disks for equalizing the pressure on opposite sides thereof. The holes are preferably located relatively close to the shaft surface and it will be evident that any grease finding its way through these openings will be diverted in a direction radially of the shaft by the disks and coacting housing wall surfaces.

When it is necessary to replenish or renew the grease in the bearing, cover caps, not shown, are removed from the inlet and outlets 28 and 29 and grease is introduced into the bearing cavity in the same manner as in present practices. The grease fills the cavity on the left side of the bearing, as viewed in FIGURE 2, and is forced axially through the bearing and into contact with disk 32. With the shaft operating at this time, the grease tends to accumulate between the disk 32 and the bearing and when a predetermined amount fills this area, the grease suddenly is exhausted through the outlet, thus obtaining a complete purging action. A significant fact associated with purging of the bearing is that the grease in the bottom areas of the bearing also was discharged suddenly from the cavity, in addition to that near the outlet. Tests carried out on a conventional 6.69″ ball bearing show that when the grease is suddenly purged from the bearing cavity in the manner described above, the amount of grease removed from the bearing approximately equals that which was supplied through the inlet. For example, 360 grams of new grease of purple color was pumped into the bearing cavity which contained a bearing operating in an optimum amount of yellow grease. When the purging action was complete, the purple grease occupied the cavity with only very slight traces of yellow and when the exhausted grease was weighed it was found to be exactly equal to that pumped into the bearing cavity. In another test 115% of the grease was removed from the bearing and the difference is attributed to the fact that the bearing cavity before purging was packed with a slight excess of grease.

Since it is easier for the grease to follow the path indicated by the unbroken arrows, very little will be recirculated through the bearing. It is therefore possible to determine with a reasonable degree of accuracy exactly how much grease should be used in carrying out the regreasing process. Having once determined this, the manufacturer can then indicate with certainty the amount of grease to be added to a bearing when it is necessary to replace the old grease with new.

In view of the above, it will be evident that many modifications and variations are possible in light of the above teachings. For example, in order to obtain the circulating and purging action performed by the pumping disks, the latter may be corrugated or other indentations or projections formed thereon for fulfilling their intended function. Instead of lying in a plane perpendicular with the shaft axis, the disks may be distorted, such as to a helical configuration, for fulfilling the pumping function. In some instances a single large disk may be used while in others, one of the disks may be mounted immovably on the housing walls. It is obvious that the chamber need not be located on the top of the housing although this is preferable. Also, a plurality of such chambers may be positioned in the housing and around the bearing periphery. The outlet 29 need not be connected with the chamber 38 because in some instances, it would be preferable to have it in substantial alignment with the space between the disk and bearing and at any place peripherally around housing 12. Although a ball bearing arrangement has been employed for illustrating the inventive concepts, it will be apparent that other anti-friction bearings of this type may be used, such as needle bearings, roller bearings, and the like. Also, the size of the bearing is not significant.

It therefore is to be understood that within the scope of the appended claims the invention may be practiced otherwise than as specifically described.

What I claim as new and desire to secure by United States Letters Patent is:

1. An improved bearing for a machine comprising a housing and shaft defining a bearing cavity, a shaft mounted anti-friction bearing in said cavity, a chamber in said housing providing communication between opposite sides of said bearing, a pair of different diameter disks mounted on the shaft on opposite sides of said bearing and adjacent the housing walls for effecting circulation of lubricant through the bearing, said disks having their outer face surfaces and a major portion of their inner face surfaces free of contact with other structural parts of said bearing, and pressure relieving means in said disks for preventing the establishment of an area of reduced pressure between the housing walls and said disks.

2. An improved bearing for a machine comprising a housing and shaft defining a bearing cavity, a shaft mounted anti-friction bearing in said cavity, a chamber in said housing providing communication between opposite sides of said bearing, a pair of different diameter disks mounted on the shaft on opposite sides of said bearing and adjacent the housing walls for effecting circulation of lubricant through the bearing, and pressure relieving means in said disks for preventing the establishment of an area of reduced pressure between the housing walls and said disks, a lubricant inlet in said housing extending into that area of said bearing cavity on one side of the bearing, and an outlet in the housing communicating with the other side so that when old grease in said bearing is replenished with new, said disks are effective in circulating the new grease through the bearing and into said chamber prior to discharge through the outlet for completely purging the bearing of grease.

3. The combination according to claim 2 wherein said outlet is connected with said chamber.

(References on following page)

References Cited in the file of this patent

UNITED STATES PATENTS

| 1,378,658 | Clement | May 17, 1921 |
|---|---|---|
| 2,242,262 | Ray | May 20, 1941 |

OTHER REFERENCES

Product Engineering of November 1933, page 418 relied upon.